US012102580B2

(12) United States Patent
Daniels

(10) Patent No.: US 12,102,580 B2
(45) Date of Patent: Oct. 1, 2024

(54) HOSPITAL BED WITH INFLATABLE BLADDERS WITH RANDOM INFLATION AND RELATED METHODS

(71) Applicant: Encompass Group, LLC., McDonough, GA (US)

(72) Inventor: Michelle Daniels, McDonough, GA (US)

(73) Assignee: ENCOMPASS GROUP, LLC., McDonough, GA (US)

( * ) Notice: Subject to any disclaimer, the term of this patent is extended or adjusted under 35 U.S.C. 154(b) by 0 days.

(21) Appl. No.: 18/342,141

(22) Filed: Jun. 27, 2023

(65) Prior Publication Data

US 2023/0338214 A1 Oct. 26, 2023

Related U.S. Application Data

(63) Continuation of application No. 17/344,001, filed on Jun. 10, 2021, now Pat. No. 11,717,455, which is a continuation of application No. 16/430,582, filed on Jun. 4, 2019, now Pat. No. 11,071,668.

(60) Provisional application No. 62/680,267, filed on Jun. 4, 2018.

(51) Int. Cl.
*A61G 7/057* (2006.01)
*A61G 7/015* (2006.01)
*A61G 7/018* (2006.01)

(52) U.S. Cl.
CPC ......... *A61G 7/05769* (2013.01); *A61G 7/015* (2013.01); *A61G 7/018* (2013.01); *A61G 2203/34* (2013.01)

(58) Field of Classification Search
CPC .... A61G 7/05769; A61G 7/015; A61G 7/018; A61G 7/05776; A61G 7/05784; A61G 2203/34; A61G 2210/70; A47C 21/044; A47C 21/042
See application file for complete search history.

(56) References Cited

U.S. PATENT DOCUMENTS

| | | | | |
|---|---|---|---|---|
| 5,010,608 | A | | 4/1991 | Barnett et al. |
| 5,138,729 | A | | 8/1992 | Ferrand |
| 5,373,595 | A | | 12/1994 | Johnson et al. |
| 5,560,057 | A | | 10/1996 | Madsen et al. |
| 5,815,864 | A | | 10/1998 | Sloop |
| 6,115,860 | A | * | 9/2000 | Vrzalik .............. A61G 7/05776 5/713 |
| 6,536,056 | B1 | | 3/2003 | Vrzalik et al. |

(Continued)

FOREIGN PATENT DOCUMENTS

| | | |
|---|---|---|
| GB | 2090734 | 7/1982 |

*Primary Examiner* — Justin C Mikowski
*Assistant Examiner* — Alison N Labarge
(74) *Attorney, Agent, or Firm* — Allen, Dyer, Doppelt + Gilchrist, PA

(57) ABSTRACT

A hospital bed may include a support structure, a controller, a pressure source coupled to the controller, and a hospital bed mattress carried by the support structure and having first and second ends, and first and second sides extending between the first and second ends. The hospital bed mattress may include bladders coupled to the pressure source. The bladders extend between the first and second ends and between the first and second sides and configured to provide pressure differential. The controller may be configured to pseudo-randomly adjust an internal pressure of each of the bladders.

20 Claims, 11 Drawing Sheets

(56) References Cited

U.S. PATENT DOCUMENTS

| | | | | |
|---|---|---|---|---|
| 7,219,380 | B2 | 5/2007 | Beck et al. | |
| 7,296,315 | B2 | 11/2007 | Totton et al. | |
| 7,346,945 | B2 | 3/2008 | Phillips et al. | |
| 7,886,386 | B2 * | 2/2011 | Balonick | A47C 27/082 5/709 |
| 11,071,668 | B1 | 7/2021 | Daniels | |
| 2002/0050010 | A1 | 5/2002 | Shimade | |
| 2005/0177952 | A1 | 8/2005 | Wilkinson et al. | |
| 2006/0085919 | A1 | 4/2006 | Kramer et al. | |
| 2010/0063638 | A1 * | 3/2010 | Skinner | A47C 27/08 5/713 |
| 2010/0281619 | A1 | 11/2010 | Beck et al. | |
| 2011/0094040 | A1 | 4/2011 | deGreef et al. | |
| 2011/0296621 | A1 | 12/2011 | McKenna | |
| 2012/0317714 | A1 * | 12/2012 | Matschurek | A61G 7/001 5/81.1 RP |
| 2014/0101862 | A1 * | 4/2014 | Misaki | A61G 7/05769 5/710 |
| 2015/0059100 | A1 * | 3/2015 | Brubaker | A61G 7/05738 5/713 |
| 2016/0038101 | A1 * | 2/2016 | Benner | A61B 5/055 5/421 |
| 2018/0042395 | A1 * | 2/2018 | Bosley | A61G 7/05715 |
| 2018/0042800 | A1 | 2/2018 | Krasnov et al. | |
| 2019/0000700 | A1 | 1/2019 | Daniels et al. | |
| 2021/0106256 | A1 | 4/2021 | Kogure et al. | |
| 2022/0234695 | A1 | 7/2022 | Zhou | |

* cited by examiner

BOUNTRIES AND RANDOM TARGET PRESSURE GENERATION

| PATIENT WEIGHT SETTING | MAXIMUM INFLATION PRESSURE (mmHg) | MINIMUM INFLATION PRESSURE (mmHg) | INFLATION UPPER BOUNDARY | INFLATION LOWER BOUNDARY | RANDOMLY SELECTED INFLATION PRESSURE | DEFLATION UPPER BOUNDARY | DEFLATION LOWER BOUNDARY | RANDOMLY SELECTED DEFLATION PRESSURE |
|---|---|---|---|---|---|---|---|---|
| MAX | 35 | | 40.25 | 15.75 | 33 | 17.5 | 5.4 | 13 |
| 10 | 32 | 6 | 36.8 | 14.4 | 33 | 16 | 5.4 | 8 |
| 9 | 30 | 6 | 34.5 | 13.5 | 15 | 15 | 5.4 | 11 |
| 8 | 28 | 6 | 32.2 | 12.6 | 19 | 14 | 4.5 | 6 |
| 7 | 25 | 5 | 28.75 | 11.25 | 21 | 12.5 | 4.5 | 8 |
| 6 | 22 | 5 | 25.3 | 9.9 | 11 | 11 | 4.5 | 10 |
| 5 | 19 | 5 | 21.85 | 8.55 | 16 | 9.5 | 4.5 | 8 |
| 4 | 16 | 6 | 18.4 | 7.2 | 14 | 8 | 5.4 | 8 |
| 3 | 14 | 6 | 16.1 | 6.3 | 8 | 7 | 5.4 | 7 |
| 2 | 13 | 5 | 14.95 | 5.85 | 14 | 6.5 | 4.5 | 6 |
| 1 | 13 | 5 | 14.95 | 5.85 | 6 | 6.5 | 4.5 | 6 |

INFLATION CYCLE TIME
TIME IN MINUTE

LOWER LIMIT 2
UPPER LIMIT 8

ROUND TO NEAREST 1/4 MINUTE

| | |
|---|---|
| RANDOM INFLATION TIME | 6.34 |

FIG. 10

BOUNTRIES AND RANDOM TARGET PRESSURE GENERATION

| PATIENT WEIGHT SETTING | MAXIMUM INFLATION PRESSURE (mmHg) | MINIMUM INFLATION PRESSURE (mmHg) | INFLATION UPPER BOUNDARY | INFLATION LOWER BOUNDARY | RANDOMLY SELECTED INFLATION PRESSURE | DEFLATION UPPER BOUNDARY | DEFLATION LOWER BOUNDARY | RANDOMLY SELECTED DEFLATION PRESSURE |
|---|---|---|---|---|---|---|---|---|
| MAX | 35 | | 40.25 | 15.75 | 39 | 17.5 | 5.4 | 7 |
| 10 | 32 | 6 | 36.8 | 14.4 | 36 | 16 | 5.4 | 6 |
| 9 | 30 | 6 | 34.5 | 13.5 | 32 | 15 | 5.4 | 13 |
| 8 | 28 | 6 | 32.2 | 12.6 | 15 | 14 | 4.5 | 12 |
| 7 | 25 | 5 | 28.75 | 11.25 | 15 | 12.5 | 4.5 | 7 |
| 6 | 22 | 5 | 25.3 | 9.9 | 22 | 11 | 4.5 | 10 |
| 5 | 19 | 5 | 21.85 | 8.55 | 19 | 9.5 | 4.5 | 8 |
| 4 | 16 | 6 | 18.4 | 7.2 | 17 | 8 | 5.4 | 7 |
| 3 | 14 | 6 | 16.1 | 6.3 | 16 | 7 | 5.4 | 6 |
| 2 | 13 | 5 | 14.95 | 5.85 | 13 | 6.5 | 4.5 | 5 |
| 1 | 13 | 5 | 14.95 | 5.85 | 6 | 6.5 | 4.5 | 5 |

INFLATION CYCLE TIME
TIME IN MINUTE

LOWER LIMIT 2
UPPER LIMIT 8

ROUND TO NEAREST 1/4 MINUTE

| | |
|---|---|
| RANDOM INFLATION TIME | 5.18 |

FIG. 11

HOSPITAL BED WITH INFLATABLE BLADDERS WITH RANDOM INFLATION AND RELATED METHODS

RELATED APPLICATION

This application is a continuation application of application Ser. No. 17/344,001, filed Sep. 23, 2021, which is a continuation of application Ser. No. 16/430,582 filed Jun. 4, 2019, now U.S. Pat. No. 11,071,668, which claimed priority to Application No. 62/680,267 filed Jun. 4, 2018, the entire subject matter of which is incorporated herein by reference in its entirety.

TECHNICAL FIELD

The present disclosure relates to the field of hospital equipment, and, more particularly, to a hospital bed and related methods.

BACKGROUND

A modern hospital is a complex specialized service provider. Given the nature of the service being provided, the typical modern hospital is stocked with a multitude of medical devices. Although many of these medical devices were developed in the last 50 years, for example, the magnetic resonance imaging (MRI) device, there are some medical devices that have been mainstays in hospitals for well over a century. One such long lived medical device is the hospital bed.

In their earliest incarnation, hospital beds were largely identical to typical beds, but in the early 1800s, early approaches added adjustable side rails to the beds. Subsequently, wheels were added to the hospital bed to permit easy movement for bedridden patients. In the mid-1900s, the modern three-segment hospital bed became available. This hospital bed was motorized and permitted adjustment of the foot section, midsection, and head section of the bed. Additional features added to hospital beds include bed exit alarms, and a “CPR” mode for administration of cardiopulmonary resuscitation (CPR).

Another part of the hospital bed that has received attention is the hospital bed mattress, also known as a therapeutic mattress or medical mattress. The hospital bed mattress is designed to accommodate the person lying on it and to be able to move with the head, foot and height adjustments of which hospital beds are capable, i.e. it needs to be flexible. Another feature in hospital bed mattresses is bed sore prevention. One approach to this feature is to provide a plurality of air bladders within the hospital bed mattress, which are selectively activated to change pressure points on a patient’s skin.

SUMMARY

Generally, a hospital bed comprises a controller, a pressure source coupled to the controller, and a hospital bed mattress having first and second ends, and first and second sides extending between the first and second ends. The hospital bed mattress comprises a plurality of bladders coupled to the pressure source, and a base foam layer carrying the plurality of bladders. The base foam layer comprises opposing first and second ends. The first end of the base foam layer is to receive a head of a patient, and the second end of the base foam layer is to receive feet of the patient. The base foam layer comprises an upper major surface between the first and second ends to receive the patient, and a lower major surface between the first and second ends opposite the upper major surface The base foam layer also includes a plurality of upper ribs on the upper major surface, and a plurality of lower ribs on the lower major surface and being spaced apart from the plurality of upper ribs along a longitudinal axis extending from the first end to the second end so that the plurality of upper ribs and the plurality of lower ribs do not vertically overlap. The plurality of bladders extends across the hospital bed mattress and is configured to provide pressure differential. The controller is configured to pseudo-randomly set an inflation internal pressure of each of the plurality of bladders, and pseudo-randomly set a deflation internal pressure of each of the plurality of bladders.

In particular, the controller may be configured to pseudo-randomly set an inflation time period and a deflation time period for each of the plurality of bladders. The controller may be configured to randomly adjust the inflation internal pressure and the deflation internal pressure of each of the plurality of bladders. The controller may be configured to pseudo-randomly adjust an internal pressure of each individual bladder independently of other bladders.

In some embodiments, the hospital bed may further comprise a coolant pump coupled to the controller, and a plurality of channels carried by the hospital bed mattress and coupled to the coolant pump. The coolant pump may be configured to recirculate coolant fluid within the plurality of channels to remove thermal energy from the hospital bed mattress. Also, the plurality of channels may be adjacent an upper surface of the hospital bed mattress.

Additionally, the controller may be configured to pseudo-randomly adjust the inflation internal pressure and the deflation internal pressure to prevent physiological acclimatization to loading by a patient on the hospital bed mattress. The plurality of bladders may comprise overlapping bladders. The controller may be configured to divide the plurality of bladders into a plurality of sections, and pseudo-randomly adjust an internal pressure of each section independently.

Another aspect is directed to a method for making a hospital bed. The method comprises coupling a pressure source to a controller, and positioning a hospital bed mattress having first and second ends, and first and second sides extending between the first and second ends. The hospital bed mattress comprises a plurality of bladders coupled to the pressure source, and a base foam layer carrying the plurality of bladders. The base foam layer comprises opposing first and second ends. The first end of the base foam layer is to receive a head of a patient, and the second end of the base foam layer is to receive feet of the patient. The base foam layer also includes an upper major surface between the first and second ends to receive the patient, a lower major surface between the first and second ends opposite the upper major surface, a plurality of upper ribs on the upper major surface, and a plurality of lower ribs on the lower major surface and being spaced apart from the plurality of upper ribs along a longitudinal axis extending from the first end to the second end. The plurality of bladders extends across the hospital bed mattress and configured to provide pressure differential. The method also comprises configuring the controller to pseudo-randomly set an inflation internal pressure of each of the plurality of bladders, and pseudo-randomly set a deflation internal pressure of each of the plurality of bladders.

BRIEF DESCRIPTION OF THE DRAWINGS

FIGS. 10 and 11 are tables of exemplary iterations of the random pressure generation algorithm of the hospital bed, according to the present disclosure.

DETAILED DESCRIPTION

Figure 1:
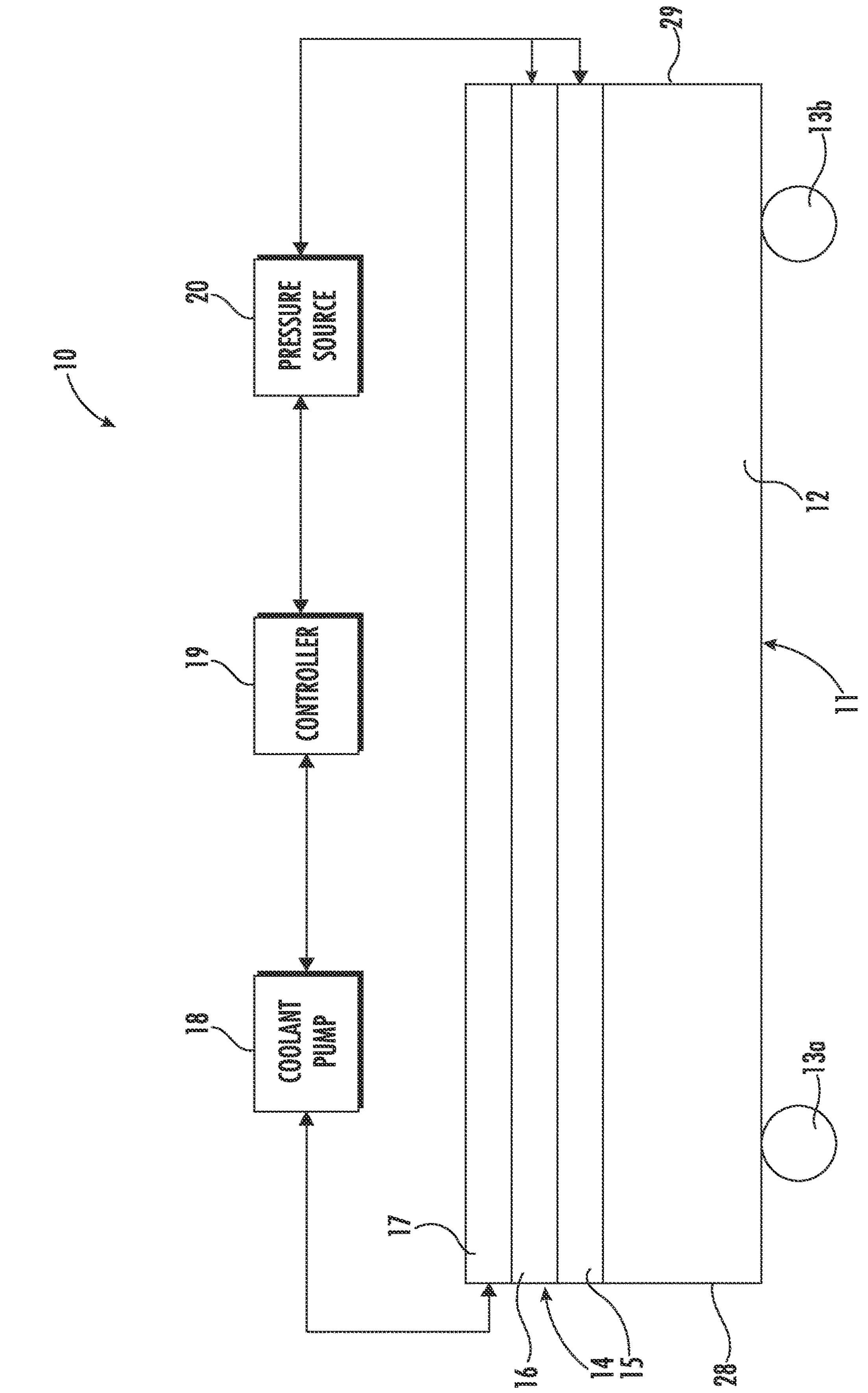
FIG. 1 is a schematic diagram of a hospital bed, according to the present disclosure.

The present disclosure will now be described more fully hereinafter with reference to the accompanying drawings, in which several embodiments of the present disclosure are shown. This present disclosure may, however, be embodied in many different forms and should not be construed as limited to the embodiments set forth herein. Rather, these embodiments are provided so that this disclosure will be thorough and complete, and will fully convey the scope of the present disclosure to those skilled in the art. Like numbers refer to like elements throughout, and base 100 reference numerals are used to indicate similar elements in alternative embodiments.

Figure 2:
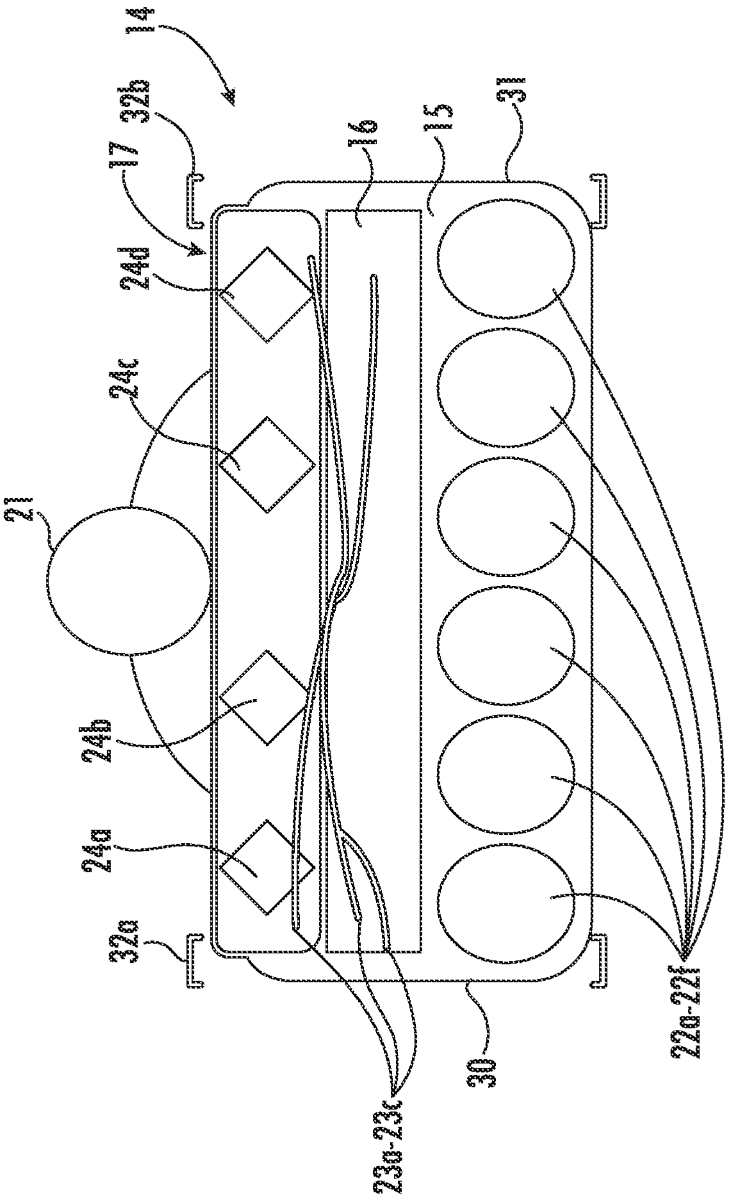
FIG. 2 is a schematic cross-sectional view of the hospital bed, according to the present disclosure.

Referring initially to FIGS. 1-2, a hospital bed 10 according to the present disclosure is now described. The hospital bed 10 illustratively includes a support structure 11. The support structure 11 illustratively includes a base portion 12, and a plurality of wheels 13*a*-13*b* coupled to the base portion. As will be appreciated by those skilled in the art, the support structure 11 may adjust positions of the head section, the midsection, and the foot section of the base portion 12. Also, the support structure 11 may adjust the height of the base portion 12. The hospital bed 10 illustratively includes a controller 19, a pressure source (e.g. air compressor device) 20 coupled to the controller, and a coolant pump 18 coupled to the controller.

The controller 19 may comprise logic circuitry configured to control the pressure source 20 and the coolant pump 18. In other embodiments, the hospital bed 10 includes a control panel (not shown) coupled to the controller 19 and configured to permit user selected activity of the pressure source 20 and the coolant pump 18. The control panel may include a plurality of switches for manipulating the hospital bed 10. The hospital bed 10 may also include a wireless transceiver (not shown, e.g. WiFi (IEEE 802.11 variant), Bluetooth, ZigBee (IEEE 802.15.4)) coupled to the controller 19 and configured to permit remote control and/or monitoring of the hospital bed 10.

The hospital bed 10 illustratively includes a hospital bed mattress 14 carried by the support structure 11 and having first and second ends 28, 29, and first and second sides 30, 31 extending between the first and second ends. The hospital bed mattress 14 is configured to receive a patient 21 on an upper surface thereof. The hospital bed mattress 14 illustratively includes a plurality of longitudinal bladders 22*a*-22*f* coupled to the pressure source 20 and extending between the first and second ends 28, 29 and configured to provide lateral pressure differential. The hospital bed mattress 14 illustratively includes a base foam layer 15 carrying the plurality of longitudinal bladders 22*a*-22*f*. The base foam layer 15 may include a rigid foam.

The hospital bed mattress 14 illustratively includes a plurality of transverse bladders 23*a*-23*c* coupled to the pressure source 20 and extending between the first and second sides 30, 31. The plurality of transverse bladders 23*a*-23*c* is configured to provide longitudinal pressure differential. The hospital bed mattress 14 illustratively includes a first medial layer 16 carrying the plurality of transverse bladders 23*a*-23*c*. The plurality of transverse bladders 23*a*-23*c* and the plurality of longitudinal bladders 22*a*-22*f* are overlapping.

As will be appreciated by those skilled in the art, the plurality of longitudinal bladders 22*a*-22*f* and the plurality of transverse bladders 23*a*-23*c* are controlled via the controller 19 to prevent bed sore incidence in the patient 21 and to aid with movement of the patient for repositioning and removal from the hospital bed mattress 14. The hospital bed mattress 14 includes a plurality of tubes (not shown) coupled between the pressure source 20, and the plurality of longitudinal bladders 22*a*-22*f* and the plurality of transverse bladders 23*a*-23*c*.

In some embodiments, the controller 19 is configured to divide the plurality of longitudinal bladders 22*a*-22*f* into a plurality of sections, and the controller is configured to control each section individually and separately from other sections. Also, the controller 19 is configured to divide the plurality of transverse bladders 23*a*-23*c* into a plurality of sections, and the controller is configured to control each section individually and separately from other sections. Advantageously, the controller 19 may be configured to selectively activate sections of the plurality of longitudinal bladders 22*a*-22*f* and sections of the plurality of transverse bladders 23*a*-23*c* to provide alternating pressure therapy to the patient 21.

The plurality of transverse bladders 23*a*-23*c* may comprise accordion bellows configured to extend vertically between first and second major surfaces of the hospital bed mattress 14. In fact, in some embodiments, each transverse bladder 23*a*-23*c* comprises a set of accordion bellows (i.e. each section here comprises a single accordion bellows) being aligned and extending between the first and second sides 30, 31 of the hospital bed mattress 14. These embodiments more readily impart longitudinal pressure differential to the patient 21.

Also, the controller 19 is configured to selectively control inflation and deflation of each accordion bellows, and to coordinate deflation of respective accordion bellows above longitudinal bladders 22*a*-22*f* being inflated. This feature insures that the longitudinal bladders 22*a*-22*f* being inflated do not impart too much lateral pressure differential on the patient 21.

The hospital bed mattress 14 illustratively includes a plurality of channels 24*a*-24*d* coupled to the coolant pump 18. The plurality of channels 24*a*-24*d* is adjacent an upper surface of the hospital bed mattress 14 and configured to circulate a coolant fluid. The hospital bed mattress 14 illustratively includes a convoluted foam layer 17 carrying the plurality of channels 24*a*-24*d*.

Additionally, each channel 24*a*-24*d* illustratively includes a rectangle-shaped tube (i.e. a cross-sectional shape). In other embodiments, the plurality of channels 24*a*-24*d* may have other shapes, such as a circle-shaped tube, or a square-shaped tube.

Helpfully, the plurality of channels 24*a*-24*d* may provide for a cooling feature for the patient 21. In particular, the thermal energy from the patient 21 is transferred to the coolant fluid and exited the hospital bed mattress 14.

The coolant pump 18 is configured to recirculate the coolant fluid through the plurality of channels 24*a*-24*d*, and to exhaust thermal energy removed from the patient 21. In some embodiments, the coolant pump 18 may include an active refrigeration element to further reduce the temperature of the coolant fluid as it recirculates.

For example, the coolant fluid may comprise at least one of air and water. In one embodiment, the coolant fluid comprises air, and the coolant pump 18 may comprise an air pump, which may be integrated with or separate from (as in the illustrated embodiment) the pressure source 20. The coolant pump 18 may be coupled to the plurality of channels 24*a*-24*d* via a plurality of tubes (not shown).

The hospital bed mattress 14 illustratively includes first and second rails 32*a*-32*b* configured to retain the patient 21. Helpfully, the first and second rails 32*a*-32*b* may prevent accidental falls.

Another aspect is directed to a method for making a hospital bed 10. The method may include providing a support structure 11, coupling a pressure source 20 to a controller 19, and positioning a hospital bed mattress 14 to be carried by the support structure. The hospital bed mattress may have first and second ends 28, 29, and first and second sides 30, 31 extending between the first and second ends. The hospital bed mattress 14 may comprise a plurality of longitudinal bladders 22*a*-22*f* coupled to the pressure source 20 and extending between the first and second ends 28, 29 and configured to provide lateral pressure differential, a plurality of transverse bladders 23*a*-23*c* coupled to the pressure source and extending between the first and second sides 30, 31 and configured to provide longitudinal pressure differential, and a plurality of channels 24*a*-24*d* adjacent an upper surface of the hospital bed mattress 14 and configured to circulate a coolant fluid.

Figure 3:
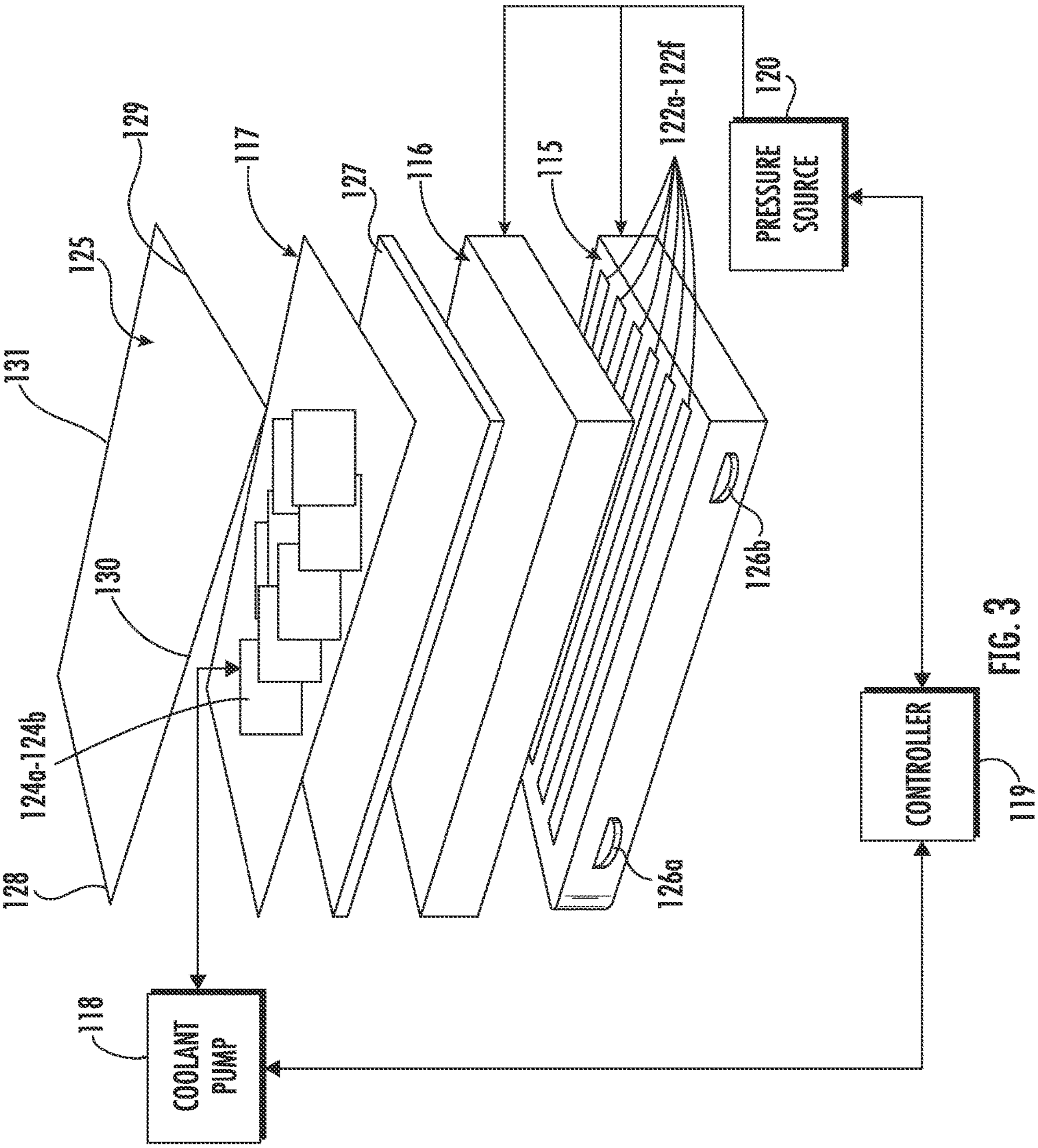
FIG. 3 is a schematic exploded view of another embodiment of the hospital bed, according to the present disclosure.

Referring now additionally to FIG. 3, another embodiment of the hospital bed 110 is now described. In this embodiment of the hospital bed 110, those elements already discussed above with respect to FIGS. 1-2 are incremented by 100 and most require no further discussion herein. This embodiment differs from the previous embodiment in that this hospital bed 110 illustratively includes a plurality of handles 126*a*-126*b* extending outward from the first and second sides 130, 131 of the hospital bed mattress 114. The plurality of handles 126*a*-126*b* is mounted onto the base foam layer 115, which is rigid in this embodiment. Advantageously, the plurality of handles 126*a*-126*b* is configured to permit emergency evacuation of the patient, i.e. carrying the patient out on the hospital bed mattress 114 separated from the support structure.

The hospital bed 110 illustratively includes a cover layer 125, and a second medial layer 127 under the convoluted foam layer 117. The cover layer 125 comprises material configured to accommodate stretching, heat wicking, low friction, and low shear risk.

Figure 4A:
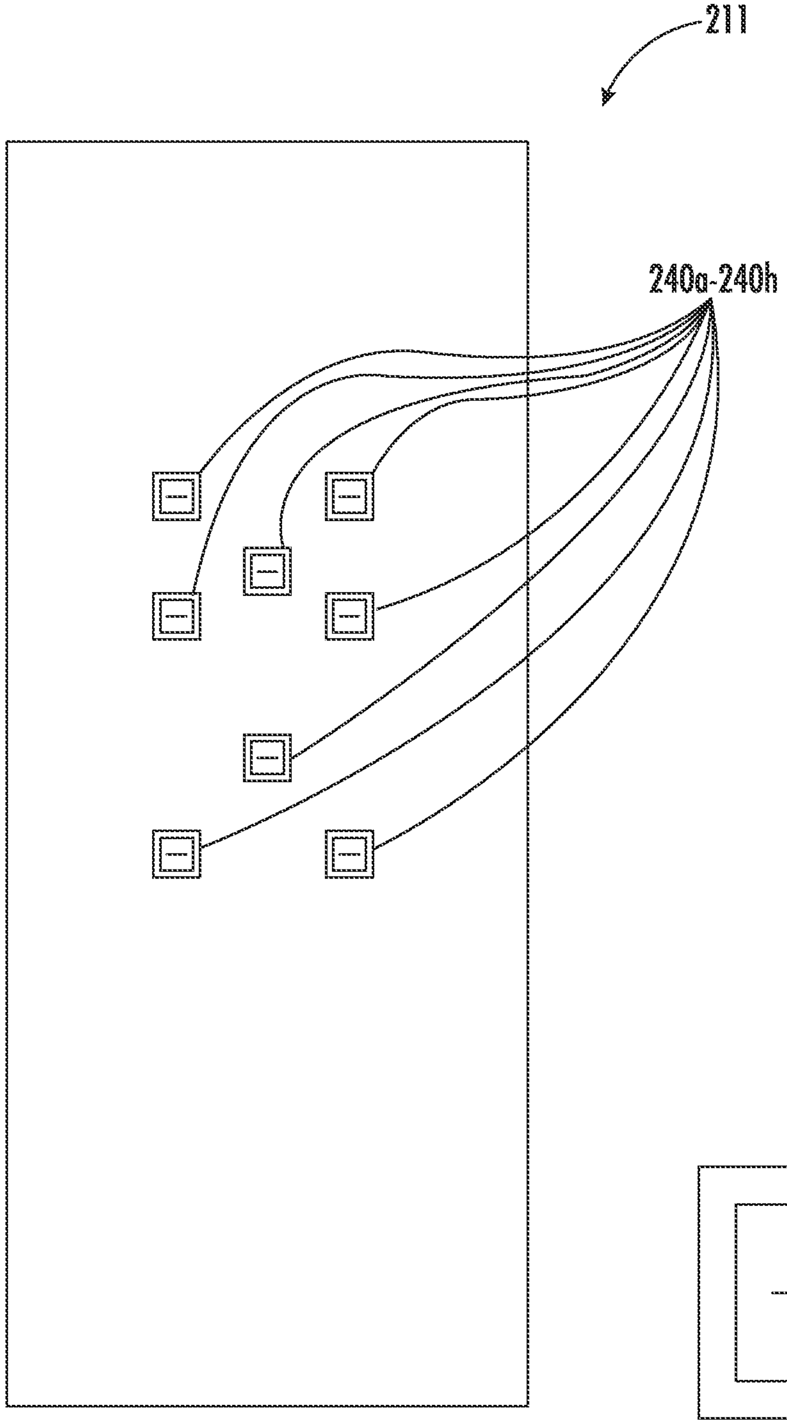
FIGS. 4A and 4B are schematic diagrams of an example embodiment of the support structure of hospital bed, according to the present disclosure.
Figure 4B:
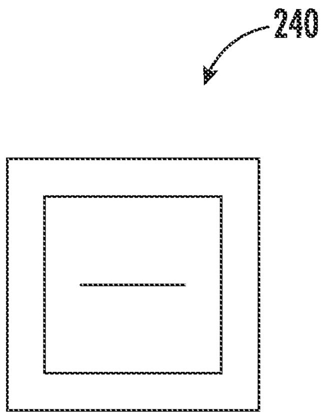
Figure 4C:
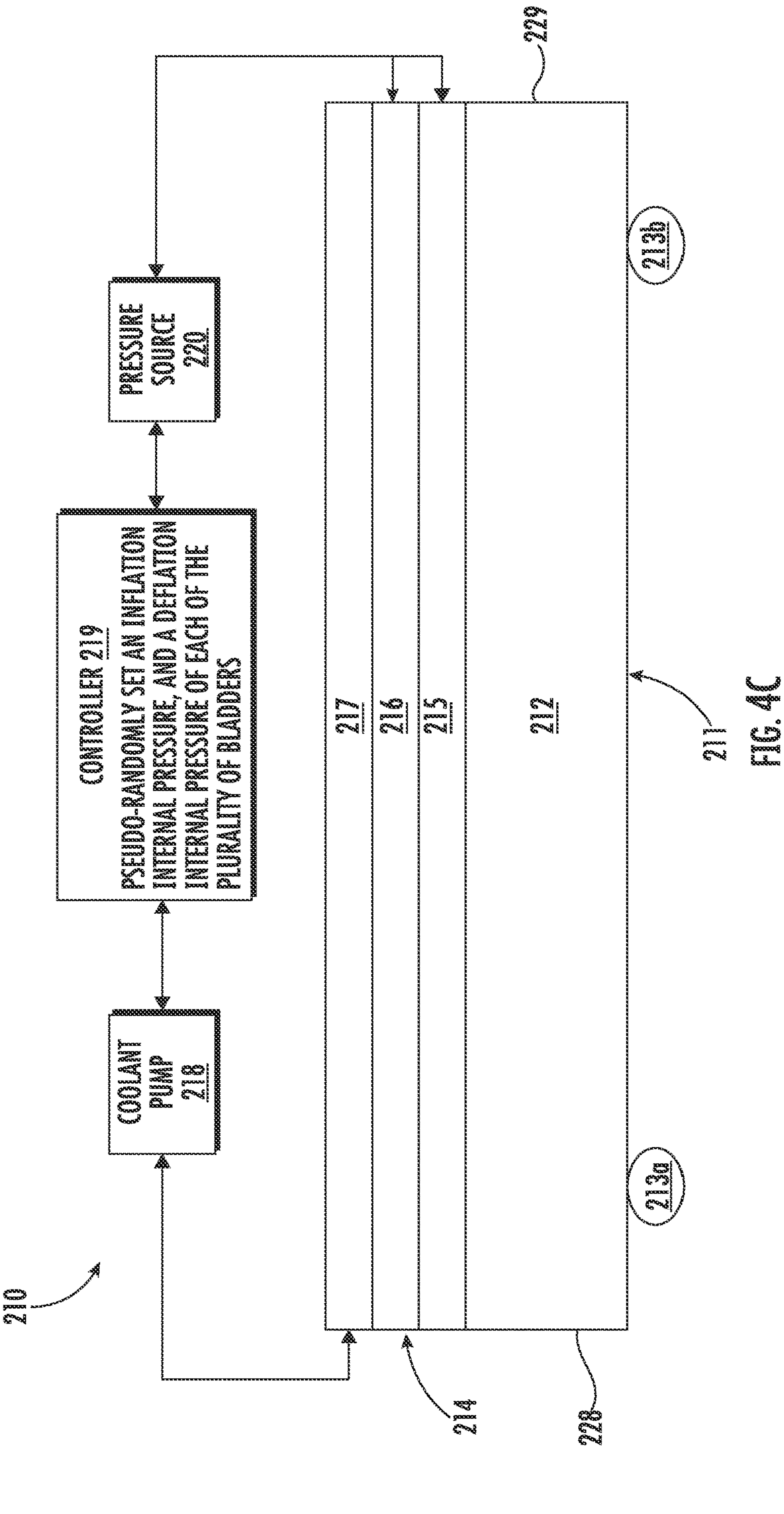
FIG. 4C is a schematic diagram of an example embodiment of a hospital bed using the support structure from FIGS. 4A-4B.

Referring now additionally to FIGS. 4A-4C, another embodiment of the hospital bed 210 is now described. In this embodiment of the hospital bed 210, those elements already discussed above with respect to FIGS. 1-3 are incremented by 200 and most require no further discussion herein. This embodiment differs from the previous embodiment in that this hospital bed 210 illustratively includes a support structure 211, a controller 219, a pressure source 220 coupled to the controller, and a hospital bed mattress 214 carried by the support structure and having first and second ends 228, 229, and first and second sides extending between the first and second ends. The hospital bed mattress 214 comprises a plurality of bladders coupled to the pressure source. The plurality of bladders extends between the first and second ends 228, 229 and between the first and second sides and configured to provide pressure differential. The controller 219 is configured to pseudo-randomly adjust an internal inflation pressure of each of the plurality of bladders.

In some embodiments, the controller 219 is configured to randomly (i.e. truly random number generation) adjust the internal inflation pressure of each of the plurality of bladders. The controller 219 is configured to pseudo-randomly adjust the internal inflation pressure of each individual bladder independently of other bladders.

The support structure 211 illustratively includes a plurality of pressure interjection ports 240*a*-240*h*. Each of the plurality of pressure interjection ports 240*a*-240*h* is individually fluidly coupled to the pressure source.

Generally speaking, the controller 219 is configured to pseudo-randomly adjust an internal pressure of each of the plurality of bladders. In particular, the controller 219 is configured to pseudo-randomly set an inflation internal pressure, and a deflation internal pressure of each of the plurality of bladders. The controller 219 is configured to pseudo-randomly set the inflation internal pressure by at least generating an upper inflation limit greater than an existing inflation internal pressure, and a lower inflation limit less than the existing inflation internal pressure, and pseudo-randomly selecting a value between the upper inflation limit and the lower inflation limit. The controller 219 is configured to pseudo-randomly set the deflation internal pressure by at least generating an upper deflation limit greater than an existing deflation internal pressure, and a lower deflation limit less than the existing deflation internal pressure, and pseudo-randomly selecting a value between the upper deflation limit and the lower deflation limit.

Also, the controller 219 is configured to set a minimum value for the lower inflation limit as a midpoint between the existing inflation internal pressure and the existing deflation internal pressure. The controller 219 is configured to set a maximum value for the upper deflation limit as a midpoint between the existing inflation internal pressure and the existing deflation internal pressure.

In some embodiments, the controller 219 is configured to pseudo-randomly set an inflation time period and a deflation time period for each of the plurality of bladders. The controller 219 is configured to randomly adjust the internal pressure of each of the plurality of bladders. The controller 219 is configured to pseudo-randomly adjust the internal pressure of each individual bladder independently of other bladders.

Another aspect is directed to a method for making a hospital bed 210. The method comprises coupling a pressure source 220 to a controller 219, and positioning a hospital bed mattress 214 to be carried by a support structure 211 and having first and second ends 228, 229, and first and second sides extending between the first and second ends. The hospital bed mattress 214 includes a plurality of bladders coupled to the pressure source 220. The plurality of bladders extends between the first and second ends 228, 229 and between the first and second sides and configured to provide pressure differential. The controller 219 is to pseudo-randomly adjust an internal pressure of each of the plurality of bladders.

Figure 5:
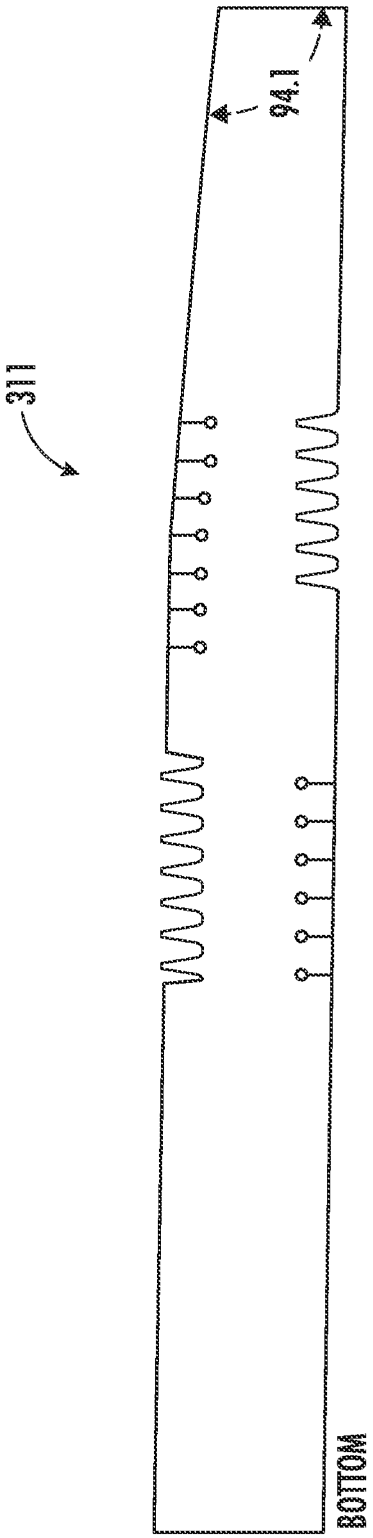
FIG. 5 is a schematic diagram of another example embodiment of the support structure of hospital bed, according to the present disclosure.

As seen in FIG. 5, another embodiment of the support structure 311 is shown. The right side of the support structure 311 illustratively includes a decline, and receives the feet of the patient. The left side is flat and receives the head of the patient. In the illustrated embodiment, the decline is at an angle of 4.1° with respect to a longitudinal axis of the support structure 311.

Figure 6:
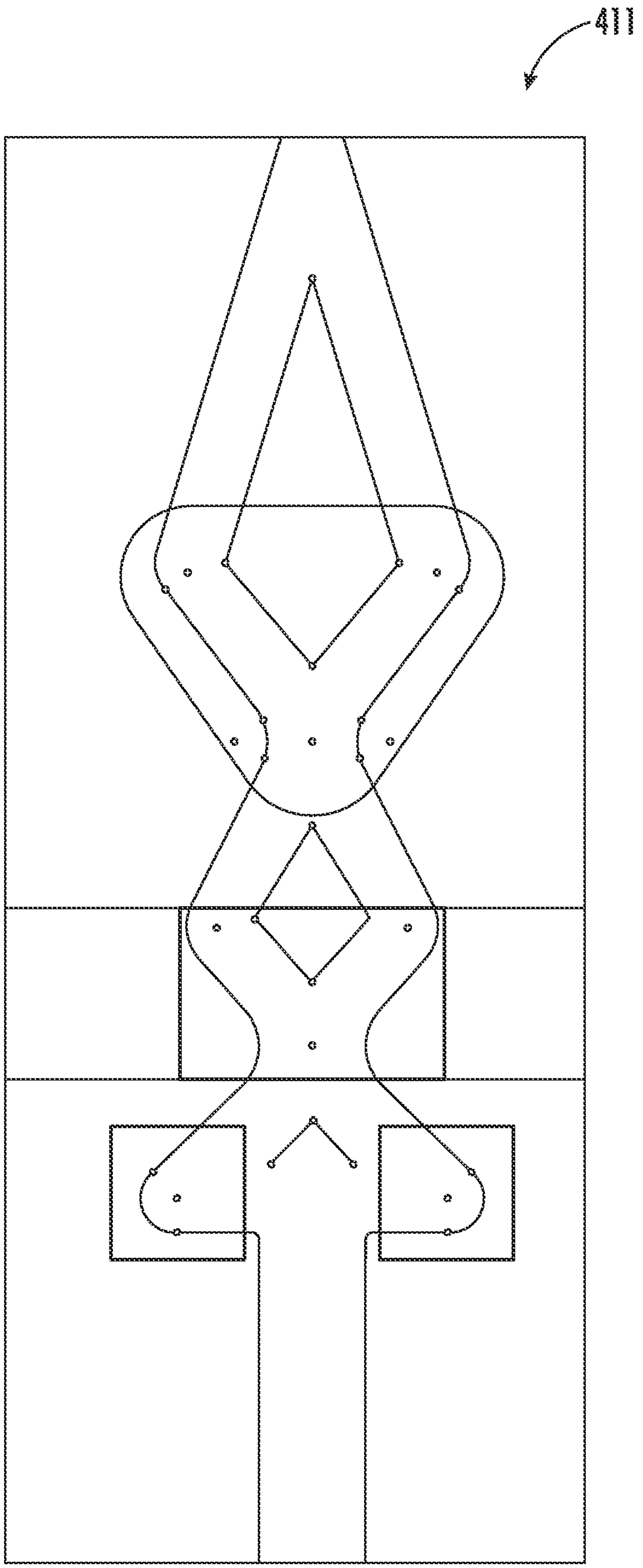
FIG. 6 is a schematic diagram of another example embodiment of the support structure of hospital bed, according to the present disclosure.
Figure 7:
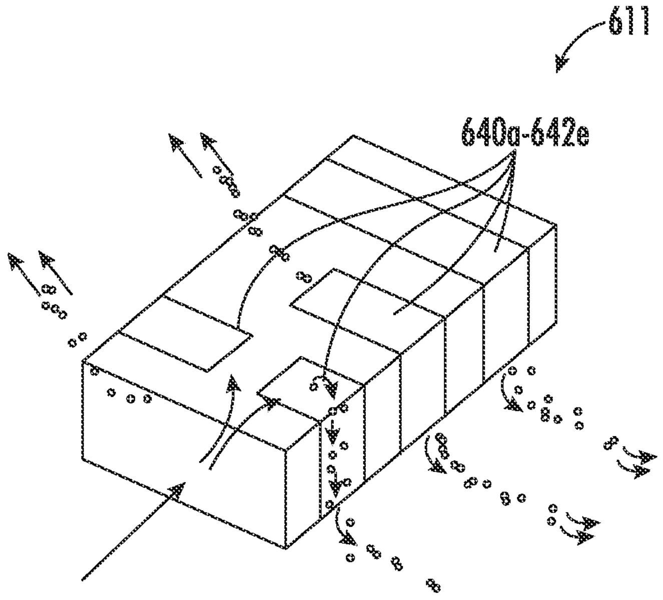
FIGS. 7 and 8 are schematic diagrams of other example embodiments of the support structure of hospital bed, according to the present disclosure.
Figure 8:
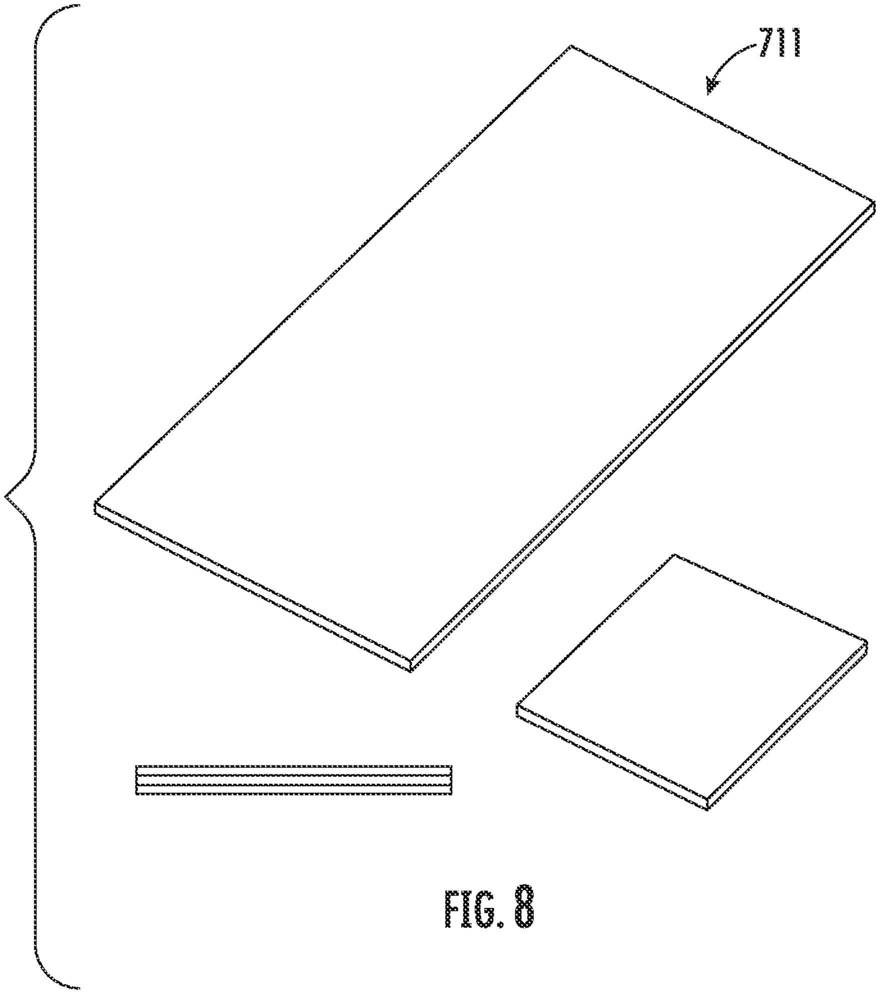

As seen in FIG. 6, another embodiment of the support structure 411 is shown. Also, FIGS. 7 and 8 depict additional embodiments of the support structure. In the embodiment of FIG. 7, the support structure 611 illustratively includes five pressure interjection ports 640*a*-640*e*. In the embodiment of FIG. 8, the support structure 711 illustratively includes a three layer hospital bed mattress.

Figure 9:
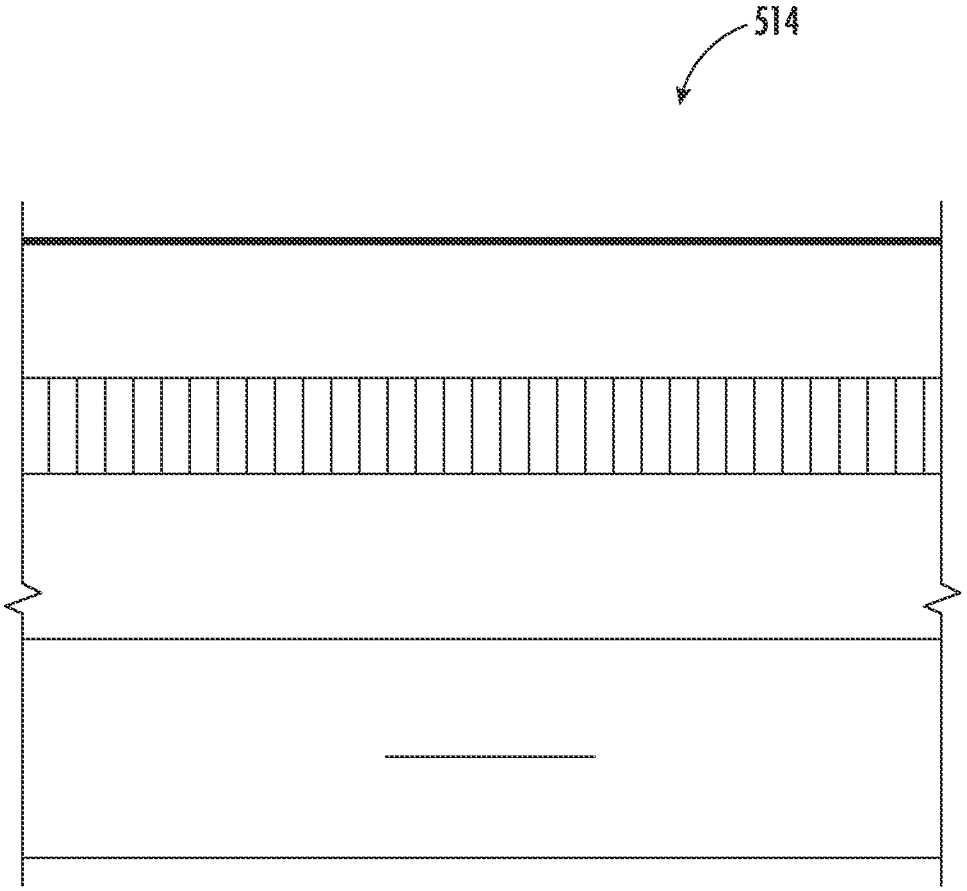
FIG. 9 is a schematic diagram of hospital bed mattress from the hospital bed, according to the present disclosure.

As seen in FIG. 9, another embodiment of the hospital bed mattress 514 is shown. The hospital bed mattress 514 illustratively includes (working from the top layer in a downward direction) a top coating layer of breathable material (as available from the Dartex division of Trelleborg Industri AB of Trelleborg, Sweden), a foam or spacer layer of fabric, a lycra (i.e. elastane) layer, and a breathable fabric layer with cutouts for the pressure interjection ports.

The controller is to provide alternating pressure inflations that have the capacity to alter pressure applied to the body in a pattern that is able to confuse the capillary bed response to loading so as to prevent physiological acclimatization to loading and reduction in circulation response that can result in increased risk to the tissues. This has impact on both superficial and deep tissues. This is called Tissue Pressure Response Management. The controller that drives the bed function is programmed to use measured pressure values, typical process limits and random number generators to achieve this result.

The controller is configured to perform a pressure change algorithm. Referring to FIGS. 10 and 11, tables provide exemplary iterations of the pressure change algorithm.

The pressure change algorithm is accomplished by adjusting the typical inflation (high pressure bladder pressure) and deflation (low pressure bladder pressure) using both upper and lower limits to bracket the amplitude and time of bladder inflation, and by using random number generators to determine the variation in direction, amplitude and time during normal operation of the alternating pressure feature of the support surface. Inflation pressures and deflation pressures are both modified in this process as well as the time of inflation.

Given the following for Alternating Pressure operation:

Inflated bladder internal pressure=X

Deflated bladder internal pressure=Y

Inflation/Deflation cycle time=T

Calculate the Tissue Pressure Response Management Profile values.

Inflation Time:

Lower limit: 2 minutes

Upper Limit: 10 minutes

Time Selection: Random number generator selects a cycle time that is between these limits with a 15 second resolution.

Inflation Pressure:

Upper limit=X+15%

Lower Limit=X−50%, bounded by the pressure that is the midpoint of X and Y. Meaning that the inflated bladder pressure would never drop below that of the deflated bladder pressure.

Amplitude Determination: Random number generator selects the pressure that falls between these limits. Pressure is held for the time determined in inflation time calculation above.

Deflation Pressure:

Upper limit=Y+50%

Lower Limit=Y−20%, bounded by the pressure that is the midpoint of X and Y. Meaning that the deflated bladder pressure would never rise above that of the inflated bladder pressure.

Amplitude Determination: Random number generator selects the pressure that falls between these limits. Pressure is held for the time determined in inflation time calculation above.

There is reason to believe that alternating the pressure of the two sets of bladders independently of each other may have value. In that case the time of the pressure application and the amplitude values for bladder set A would be determined independent of these values for set B.

In the following, an exemplary discussion regarding the hospital bed 210 is now described.

When a load is placed on the body, and by definition, "any surface will deliver some kind of mechanical stress in order to support the body" (Spahn), then the body has a physiological response to loading. This is response is known as allostatic compensation.

Physiological Responses include:

The microcirculatory response uses protective vaso-dilation in response to non-noxious pressure exposure in the tissue, call pressure-induced vasodilation (PIV) (Bergstrand)

Endothelial damage, and interstitial fluid migration

Their study showed that pressure magnitudes considered not harmful can affect the microcirculation and cause potential tissue damage, especially in deeper tissue structures. (Bergstrand)

"It is also known that the occlusion of blood supply to, and lymphatic drainage from, the tissue as a consequence of high interface loads can cause tissue damage." (Rithalia)

In most cases, the physiological responses to loading can be compensated for in healthy and mobile individuals, especially in short term. However, many patients cannot fully compensate for the inherent pressures and stress to tissues during loading: the unconscious, elderly or infirm, the immobile, the hemodynamically unstable, and even, admittedly, those who are simply non-compliant.

The body responds to load: it acclimatizes when it can, for as long as it can. When the body cannot sufficiently acclimatize, or can no longer sustain the responses, then allostatic compensation gives way to decompensation, and tissue damage occurs. This decompensation leads to damage of various levels and intensity.

Damage to tissue from unrelieved loading leads to excess tissue deformation (Oomens, Gefen) ischemia, reactive hyperemia, hypoxia reperfusion, IRI, cell death (there is a reference for each of these), etc. The end result of many of these physiological responses is pressure injury/ulcers, which are life threatening for patients, demanding for caregivers and facilities alike.

Additionally, even otherwise healthy and seemingly low risk patients have been known to develop pressure injury/ulcers, suggesting an inherent vulnerability in certain patients that would be hard to assess. Under current prevention and treatment processes, some are considered "unavoidable" (NPUAP).

Pressure Ulcer Costs, monetary and otherwise "'Your approach, and your interest in PU depends on where you stand. Or sit.'" (McInnes) Pressure ulcers occur consistently at a rate of 6.7% in the US, and the costs are high. (Laurel, use the new document the Monograph for the data on prevalence and incidence.)

The first consideration is patient care. In terms of patient distress and suffering, the annual cost for pressure ulcers is hard to fully appreciate. But in addition to the emotional toll to patients and families (and caregivers), a 6% incidence rate in pressure ulcers:

- costs caregivers in time and involvement,
- costs the facilities in resources both human and technical, and
- costs facilities in monetary resources.

Current approaches (Pressure Redistribution Devices) From sheepskins to VE foam and air pressure mattresses and overlays, they have all tried to address the problems stemming from loading tissue. However: In our comparison of the literature on pressure redistribution devices, they all about even out. Clancy says of Nixon's Randomized controlled clinical trial that, "even within the same device type it has been difficult to demonstrate a difference." That "no difference was found between Alternating pressure mattresses and alternating pressure overlays in the proportion of people who develop a PU." That McInnes Cochrane review says "the evidence comparing constant low pressure and alternating pressure support surfaces for prevention was unclear . . . "

No clear winner. No one definitive product or approach that clearly stands out as superior.

- Most studies suggest "Insufficient Data" for results, either for no definitively superior product, or insufficient data comparison, or inconclusive results.
- Several sources state variations on the theme of there is "No difference in multistage and Alternating Pressure air mattresses." (McInnes Cochrane review, 2012; Clancy, 2013; Demarre, 2012)

Need for Change

"Effective management of patients at risk of or with PUs is the key to achieving good clinical outcomes." (Cavicchioli) Current nursing practices with available devices have brought the numbers down. Indeed, without intervention, the PU incidence rate is 36%, versus 6% with some kind of pressure redistribution devices. That current rate sounds low, without an understanding that a 6% incidence rate will translate to roughly 600,000 patients annually with a pressure ulcer. (Spahn). So, part of the problem in addressing the persistent occurrence of pressure ulcers may not rest in the devices themselves, but the current plateau in how we approach the underlying problem.

Intervention

"Most pressure ulcers can be prevented if appropriate measures are instituted at an early stage." (Rithalia) Allostasis is occurring in patients. It is the process of adapting to input, and many devices provide input in an effort to help the body stave off decomposition. However, the body acclimatizes, even to such varied input as alternating pressure. Tolerance is evidence of the body attempting to normalize, which is an effort toward homeostasis. However, when allostasis fails to protect the body sufficiently, for instance when tolerance occurs, then tissue loading to the point of breakdown occurs. The body acclimatizes to input, and builds tolerance, such as when electrical stimulation such as a TENS unit will need adjusting after only 10 minutes of regular use.

However, our approach is to actively engage the allostatic response, and to engage it fully. Rather than allow acclimatization or tolerance, we are proposing a new mechanism for inducing allostasis to prevent decompensation. We propose that by randomizing both duration and intensity of pressure in the alternating pressure, this prevents the body from anticipating and thus disregarding pressure redistribution.

It should be appreciated that the pseudo-random and random pressurization teachings of FIGS. 4A-11 may be applied to the embodiments and structures disclosed in FIGS. 1-3. Moreover, these same teachings could be applied to the embodiments and structures disclosed in copending International Application No. PCT/US2018/040285 (Publication No. WO 2019/006298 A1) to Daniels, also assigned to the assignee of the present application, the contents of which are hereby incorporated by reference in their entirety.

REFERENCES (the contents of each and every reference are hereby incorporated by reference in their entirety):

Cavicchioli, A and Carella, G. Clinical effectiveness of a low-tech versus high-tech pressure-redistributing mattress. J Wound Care (July 2007) 16.7: 285-289.

Clancy, M. Pressure redistribution devices: What works, at what cost, and what's next? J Tiss Via (2013) 22: 57-62.

Bergstrand, S., et al. Microcirculatory responses of sacral tissue in healthy individuals and inpatients on different pressure-redistribution mattresses. J of Wound Care (August 2015) 24.8: 346-358.

Demarre, L., et al. Multi-stage versus single-stage inflation and deflatino cycle for alternating low pressure air mattresses to prevent pressure ulcers in hospitalised patients: a randomised-controlled clinical trial. I J of Nurs Studies (2012) 49: 416-426.

Gawlitta, D., et al. Temporal differences in the influence of ischemic factors and deformation on the metabolism of engineered skeletal muscle. J Appl Physiol (2007) 103: 464-473.

Van Londen, A., et al. The effect of surface electrical stimulation of the gluteal muscles on the interface pressure in seated people with spinal cord injury. Arch Phys Med Rehabil (September 2008) 89: 1724-1732.

Nixon, J, et al. Randomised, controlled trial of alternating pressure mattresses compared with alternating pressure overlays for the prevention of pressure ulcers: PRESSURE (pressure relieving support surfaces) trial. BMJ (June 2006) doi: 10.1136/bmj.38849.478299.7C Rithalia, S. Assessment of patient support surfaces: principle, practice and limitations. J of Med Eng & Tech. (July 2005) 29.4: 163-169.

McInnes, E., et al. Preventing pressure ulcers-Are pressure-redistributing support surfaces effective? A Cochrane systematic review and meta-analysis. I J of Nurs Studies (2012) 49; 345-359.

Spahn, J. and Duncan, C., with Butts, L, ed. Effects of a support surface on Homeostasis. Keep it Simply Scientific. EHOB 2000.

Stekelenburg, A, et al. Role of ischemia and deformation in the onset of compression-induced deep tissue injury: MRI-based studies in a rat model. J Appl Physiol (2007) 102: 2002-2011. doi: 10.1152/japplyphysiol.01115.2006.

Many modifications and other embodiments of the present disclosure will come to the mind of one skilled in the art having the benefit of the teachings presented in the foregoing descriptions and the associated drawings. Therefore, it is understood that the present disclosure is not to be limited to the specific embodiments disclosed, and that modifications and embodiments are intended to be included within the scope of the appended claims.

The invention claimed is:

1. A hospital bed comprising:

a controller;

a pressure source coupled to the controller; and a hospital bed mattress having first and second ends, and first and second sides extending between the first and second ends, the hospital bed mattress comprising a plurality of bladders coupled to the pressure source, and a base foam layer carrying the plurality of bladders, the base foam layer comprising opposing first and second ends, the first end of the base foam layer to receive a head of a patient, the second end of the base foam layer to receive feet of the patient, an upper major surface between the first and second ends to receive the patient, and a lower major surface between the first and second ends opposite the upper major surface, a plurality of upper ribs on the upper major surface, and a plurality of lower ribs on the lower major surface and being spaced apart from the plurality of upper ribs along a longitudinal axis extending from the first end to the second end so that the plurality of upper ribs and the plurality of lower ribs do not vertically overlap;

the plurality of bladders extending across the hospital bed mattress and configured to provide pressure differential;

the controller configured to pseudo-randomly set an inflation internal pressure of each of the plurality of bladders, and pseudo-randomly set a deflation internal pressure of each of the plurality of bladders.

2. The hospital bed of claim 1 wherein the controller is configured to pseudo-randomly set an inflation time period and a deflation time period for each of the plurality of bladders.

3. The hospital bed of claim 1 wherein the controller is configured to randomly adjust the inflation internal pressure and the deflation internal pressure of each of the plurality of bladders.

4. The hospital bed of claim 1 wherein the controller is configured to pseudo-randomly adjust an internal pressure of each individual bladder independently of other bladders.

5. The hospital bed of claim 1 further comprising a coolant pump coupled to the controller, and a plurality of channels carried by the hospital bed mattress and coupled to the coolant pump.

6. The hospital bed of claim 5 wherein the coolant pump is configured to recirculate coolant fluid within the plurality of channels to remove thermal energy from the hospital bed mattress.

7. The hospital bed of claim 5 wherein the plurality of channels are adjacent the upper major surface of the hospital bed mattress.

8. The hospital bed of claim 1 wherein the controller is configured to pseudo-randomly adjust the inflation internal pressure and the deflation internal pressure to prevent physiological acclimatization to loading by a patient on the hospital bed mattress.

9. The hospital bed of claim 1 wherein the plurality of bladders comprises overlapping bladders.

10. The hospital bed of claim 1 wherein the controller is configured to divide the plurality of bladders into a plurality of sections, and pseudo-randomly adjust an internal pressure of each section independently.

11. A hospital bed comprising:

a controller;

a pressure source coupled to the controller; and a hospital bed mattress having first and second ends, and first and second sides extending between the first and second ends, the hospital bed mattress comprising a plurality of overlapping bladders coupled to the pressure source, and a base foam layer carrying the plurality of overlapping bladders, the base foam layer comprising opposing first and second ends, the first end of the base foam layer to receive a head of a patient, the second end of the base foam layer having a decline to receive feet of the patient, an upper major surface between the first and second ends to receive the patient, and a lower major surface between the first and second ends opposite the upper major surface, a plurality of upper ribs on the upper major surface, and a plurality of lower ribs on the lower major surface and being spaced apart from the plurality of upper ribs along a longitudinal axis extending from the first end to the second end so that the plurality of upper ribs and the plurality of lower ribs do not vertically overlap;

the plurality of overlapping bladders extending across the hospital bed mattress and configured to provide pressure differential;

the controller configured to pseudo-randomly set an inflation internal pressure of each of the plurality of overlapping bladders, and pseudo-randomly set a deflation internal pressure of each of the plurality of overlapping bladders to prevent physiological acclimatization to loading by a patient on the hospital bed mattress.

12. The hospital bed of claim 11 wherein the controller is configured to pseudo-randomly set an inflation time period and a deflation time period for each of the plurality of overlapping bladders.

13. The hospital bed of claim 11 wherein the controller is configured to randomly adjust the inflation internal pressure and the deflation internal pressure of each of the plurality of overlapping bladders.

14. The hospital bed of claim 11 wherein the controller is configured to pseudo-randomly adjust an internal pressure of each individual bladder independently of other overlapping bladders.

15. The hospital bed of claim 11 further comprising a coolant pump coupled to the controller, and a plurality of channels carried by the hospital bed mattress and coupled to the coolant pump.

16. The hospital bed of claim 15 wherein the coolant pump is configured to recirculate coolant fluid within the plurality of channels to remove thermal energy from the hospital bed mattress.

17. The hospital bed of claim 15 wherein the plurality of channels are adjacent the upper major surface of the hospital bed mattress.

18. A method for making a hospital bed, the method comprising:

coupling a pressure source to a controller;

positioning a hospital bed mattress having first and second ends, and first and second sides extending between the first and second ends, the hospital bed mattress comprising a plurality of bladders coupled to the pressure source, and a base foam layer carrying the plurality of bladders, the base foam layer comprising opposing first and second ends, the first end of the base foam layer to receive a head of a patient, the second end of the base foam layer to receive feet of the patient, an upper major surface between the first and second ends to receive the patient, and a lower major surface between the first and second ends opposite the upper major surface, a plurality of upper ribs on the upper major surface, and a plurality of lower ribs on the lower major surface and being spaced apart from the plurality of upper ribs along a longitudinal axis extending from the first end to the second end so that the plurality of upper ribs and the plurality of lower ribs do not vertically overlap;

the plurality of bladders extending across the hospital bed mattress and configured to provide pressure differential; and configuring the controller to pseudo-randomly set an inflation internal pressure of each of the plurality of bladders, and pseudo-randomly set a deflation internal pressure of each of the plurality of bladders.

19. The method of claim 18 further comprising configuring the controller to pseudo-randomly set an inflation time period and a deflation time period for each of the plurality of bladders.

20. The method of claim 18 further comprising configuring the controller to randomly adjust the inflation internal pressure and the deflation internal pressure of each of the plurality of bladders.

* * * * *